(No Model.)
O. B. HALL.
CASH CARRIER.
No. 298,373.  Patented May 13, 1884.
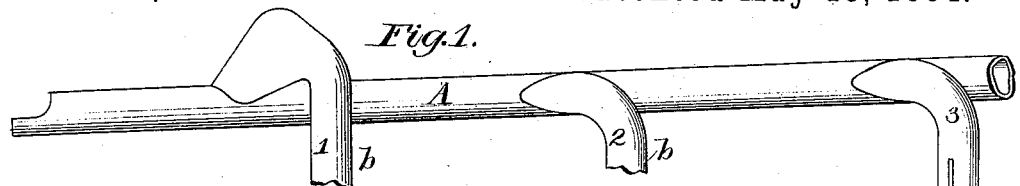
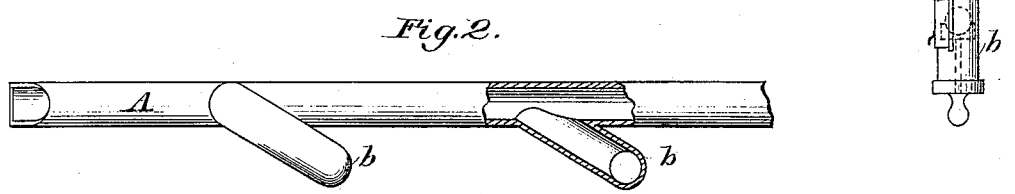
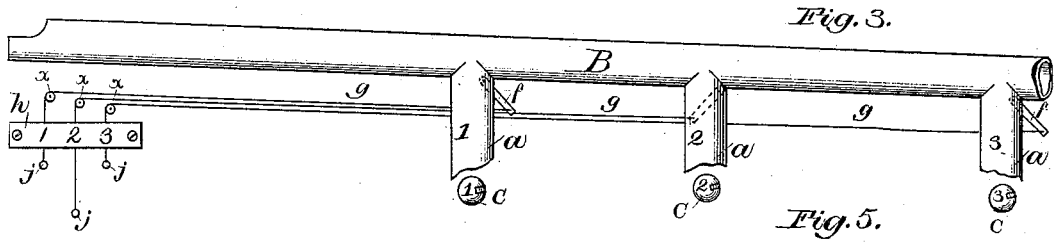
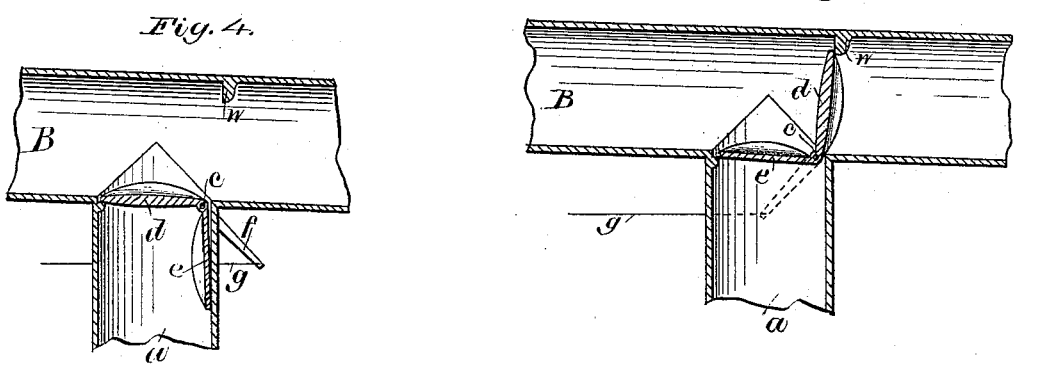
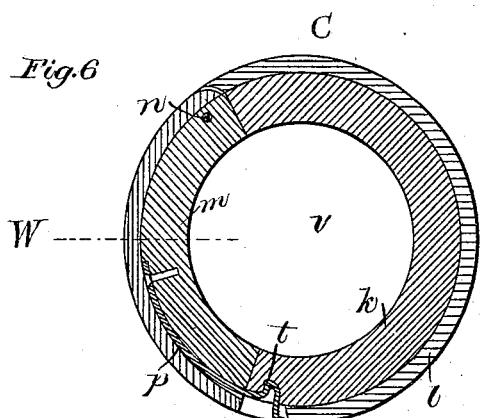
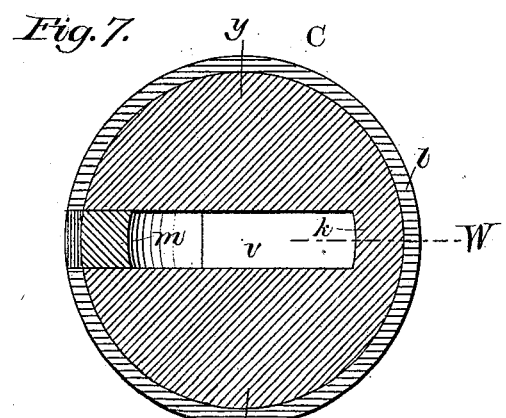
Witnesses
Eugene Humphrey
Edward Cummings
Inventor
Osborn B. Hall
per Porter & Hutchinson
Attys
N. PETERS, Photo-Lithographer, Washington, D. C.

UNITED STATES PATENT OFFICE.

OSBORN B. HALL, OF MALDEN, MASSACHUSETTS.

CASH-CARRIER.

SPECIFICATION forming part of Letters Patent No. 298,373, dated May 13, 1884.

Application filed March 19, 1884. (No model.)

*To all whom it may concern:*

Be it known that I, OSBORN B. HALL, of Malden, in the county of Middlesex and State of Massachusetts, have invented a new and useful Improvement in Cash-Carriers.

This invention relates to that class of devices whereby the salesmen at the several counters in a store transmit to the cashier's desk the money received from customers, and by which the return change is transmitted from the cashier's desk to the respective salesmen; and the invention, which, in the accompanying drawings, is shown in connection with certain of the elements embraced in United States Patent No. 293,012, issued to me on the 5th day of February, 1884, will, by the aid of said drawings, be hereinafter fully described, and specifically defined in the appended claims.

In said drawings, Figure 1 is a detached side elevation, showing a portion of the main forwarding-conduit with three connecting branches, representing three stations or counters, which, by means of said branch conduits, respectively communicate with the cashier's desk through the main conduit. Fig. 2 is a top or plan view of Fig. 1, with branch 3 thereof omitted, and with branch 2 and a limited section of the main line or conduit shown in horizontal section. Fig. 3 is an elevation similar to Fig. 1, but showing the return-conduit with three branches, with their respective switches and an annunciator or switch-board, by means of which the cashier may transmit through the same main conduit to any counter on the line the return change. Fig. 4 is a detached vertical section taken in the longitudinal line of the main conduit and one of the branches, and showing the switch closed. Fig. 5 is a view like Fig. 4, but showing the switch open. Figs. 6 and 7 are sections through the spherical cash-carrier, each being taken as on line W through the other.

In said views, A represents the main tube, by which the several clerks forward their receipts to the cashier as the same are paid by customers. Connecting with said main tube are shown three depending branch tubes, respectively marked $b'$, $b^2$, and $b^3$, the latter branch being shown as provided with the cash-ball-elevating device that was described and claimed in my said former patent; and each of said branches is to be provided with suitable elevating devices for the use of the clerk at the counters where said branches are respectively arranged. Said branches $b$ are so connected with the main tube that when the ball is impelled upward it will readily enter said tube for transmission to the cashier's desk.

For the return of the cash-balls to the respective sale-counters from whence they are forwarded, the return-tube B is provided with a series of depending branches corresponding in position with those in forwarding-tube A, so as to conform to the respective sale-counters. In each of these branches, at or near the side farthest from the cashier's desk, is arranged a small rock-shaft, $c$, on which, outside the tube, is secured a rigid arm, $f$, to which is secured a cord, $g$, extending to the cashier's desk, to be there operated, as will be described. On said rock-shaft $c$ are also secured two sections, $d\ e$, at nearly a right angle to each other, the section $d$ being weighted, and so arranged that when it is raised and rests against stop $w$ it will sustain section $e$, which then constitutes a portion of the bottom of tube B, as shown in Fig. 5, and when section $d$ is lowered, as shown in Fig. 4, it constitutes a part of the bottom wall of said tube. The cords $g$, secured to arms $f$ on rock-shafts $c$, are carried to the cashier's desk, where they hang pendent from small sheaves or rollers $x$, and passing behind and below a numbered switch-board, $h$, a small ring, $j$, or other device is suspended upon each for convenience of actuating it, said cords being respectively arranged behind a number on board $h$ corresponding with that of the branch tube $a$, in which is mounted the rock-shaft $c$, which is to be actuated by the cord.

It is to be observed that the respective cash-balls employed by the several clerks have each a prominent indicating-number, which corresponds with that of the station or branch tube at such clerk's counter, and with the number of the cord on the key-board by which such branch tube is to be rendered operative.

The practical operation of the returning devices is as follows: The cashier, desiring to return a cash-ball to its designated station, has only to observe the indicating-number thereon, and by drawing down upon ring $j$ of the cord behind the corresponding number on board $h$ the weighted section $d$ at the corresponding branch $a$ will, by the described action of such cord on arm $f$ and rock-shaft $c$ be raised against stop $w$, thereby holding section $e$ level with the bottom of tube B until the arrival of the return ball, which is started in the tube by the cashier when the cord is actuated. The ball upon its arrival at section $d$ is arrested thereby, and by its weight acting on section $e$ will depress the same, as shown in Fig. 4, thereby closing down section $d$, while the ball descends to its place, accessible for the clerk. The cords $g$ being liberated by the cashier as soon as the switch is opened, and the rings $j$ being raised as the switch is closed by the weight of the ball, the cashier has no further trouble therewith than to observe the position of rings $j$ when a ball is to be returned, in order to make sure that the previous ball has closed its switch before opening another, and to open the proper switch when a ball is to be returned. By this means all the balls may be of the same diameter, and yet returned through the same tube and delivered at their proper respective stations with the utmost certainty.

My improvement in the cash-ball itself consists in coating the metallic body $k$ with an exterior uniform thickness, $l$, of vulcanized rubber. I also form said metallic body $k$ with two loaded poles, $y\,y$, with a disk-shaped cavity, $v$, midway between said poles and central to the ball, said cavity being of such relative diameter and width as to receive about five of the largest coins that it may be desired to transmit therein. To afford access to said cavity, a section, $m$, of corresponding width and about half the circumference of the ball, is hinged at $n$, and provided with a securing-spring, $p$, fastened thereto at $s$, and having a catch, $t$, engaging in a seat in the body of the ball, from whence it is disengaged by a finger-catch, $u$. By coating this ball with rubber it is rendered virtually noiseless when in motion in the conduit, and by forming it with a disk-shaped cavity with resulting loaded poles, instead of forming it with a shell of uniform thickness, its balance is more easily maintained when it is loaded with coin, and, besides, the momentum acquired by reason of the loaded poles always secures its continuous motion in the inclined tubes, even if the inclosed coin disturbs its otherwise accurate balance, whatever may be its position.

I claim as my invention—

1. In a cash-conveyer, and in combination with an inclined tubular forwarding-conduit, A, a series of depending sections, $b$, obliquely connected, and communicating with said main conduit, and respectively provided with an elevating device, whereby the cash-ball when placed in such sections may be impelled through the same and into the main conduit, substantially as specified.

2. In a cash-conveyer, a return conduit or way provided with a series of deliveries and corresponding switches for respectively opening and closing the same, with mechanism connecting therewith and communicating with the cashier's desk or central station, whereby the cashier or attendant at such station may at will open any desired one of said deliveries for the escape of the ball thereat, substantially as specified.

3. In a cash-conveyer, and in combination with a series of deliveries and corresponding switches, with opening devices communicating with the central station, a switch-board or indicator numbered or marked coincidently with the switches, and arranged in connection with said opening devices, to respectively indicate whether said switches are open or closed, substantially as specified.

4. In a cash-conveyer, the combination, with a return-conduit having a series of numbered or severally-marked deliveries, with switches thereto, and devices for operating the same, communicating with the central station, with a switch-board numbered or marked to correspond with said conduits, of a series of cash-balls respectively numbered or marked to correspond with said deliveries and switch-board, whereby the cashier or central operator can by the mark or number on each ball determine which of said switches should be opened to deliver said ball at the counter from whence it was forwarded, substantially as specified.

5. In a cash-conveyer, the combination, with the return conduit or way with a series of deliveries arranged therein, of a rock-shaft or pivot, $c$, having an arm, $f$, secured thereon, with means for actuating the same at the central station, and an arm or section, $d$, secured on said pivot and arranged to arrest the returning ball when raised and to close the delivery when lowered, and also an arm or section, $e$, secured on said pivot and arranged to serve as an operative lever, whereby the ball when arrested by arm $d$ will shut the same down by the act of entering the delivery from the main line, substantially as specified.

6. A metallic cash-ball overlaid with rubber vulcanized *in situ*, to render said ball noiseless, substantially as specified.

7. A spherical cash-ball having a central disk-like cash-cavity therein, substantially as specified.

8. A cash-ball spherical upon its exterior, with a cash-cavity therein, and having diametrically and equally loaded poles adapted to augment its momentum, substantially as specified.

9. A spherical cash-ball formed with a central disk-like cash-cavity therein, and a pivoted corresponding section adapted to give access to and close said cavity, and provided with means to secure the same in position when closed, substantially as specified.

OSBORN B. HALL.

Witnesses:
T. W PORTER,
EUGENE HUMPHREY.